United States Patent [19]

Sidenstick et al.

[11] 4,173,069

[45] Nov. 6, 1979

[54] POWER SHEAR HEAD

[75] Inventors: Harry L. Sidenstick; Henry R. Hoffman, both of Cincinnati, Ohio

[73] Assignee: Kett Tool Co., Cincinnati, Ohio 45227

[21] Appl. No.: 908,816

[22] Filed: May 24, 1978

[51] Int. Cl.² .............................................. B26B 15/00
[52] U.S. Cl. ...................................................... 30/228
[58] Field of Search .................................. 30/228, 258

[56] References Cited

U.S. PATENT DOCUMENTS

| | | | |
|---|---|---|---|
| 2,760,265 | 8/1956 | Draenert | 30/258 X |
| 2,934,822 | 5/1960 | Docken | 30/228 X |
| 3,408,875 | 11/1968 | Briskman | 30/228 X |
| 3,583,067 | 6/1971 | Briskman | 30/228 |
| 3,808,682 | 5/1974 | Sumida | 30/228 |

Primary Examiner—Jimmy C. Peters
Attorney, Agent, or Firm—Wood, Herron & Evans

[57] ABSTRACT

A heavy duty, portable power shear device adapted to be driven by rotating a motor shaft. The shear includes two spaced stationary blades and a movable blade having two spaced arms in engagement with a circular cam ring. The cam ring surrounds an eccentric bushing connected to the motor drive shaft. The two arms of the movable blade diverge from the axis of the drive shaft and engage the periphery of the cam ring on the portion of the ring disposed toward the movable shear blade pivot. The movable blade pivot is displaced from the axis of the drive shaft on the side of the axis remote from the cutting blades.

4 Claims, 6 Drawing Figures

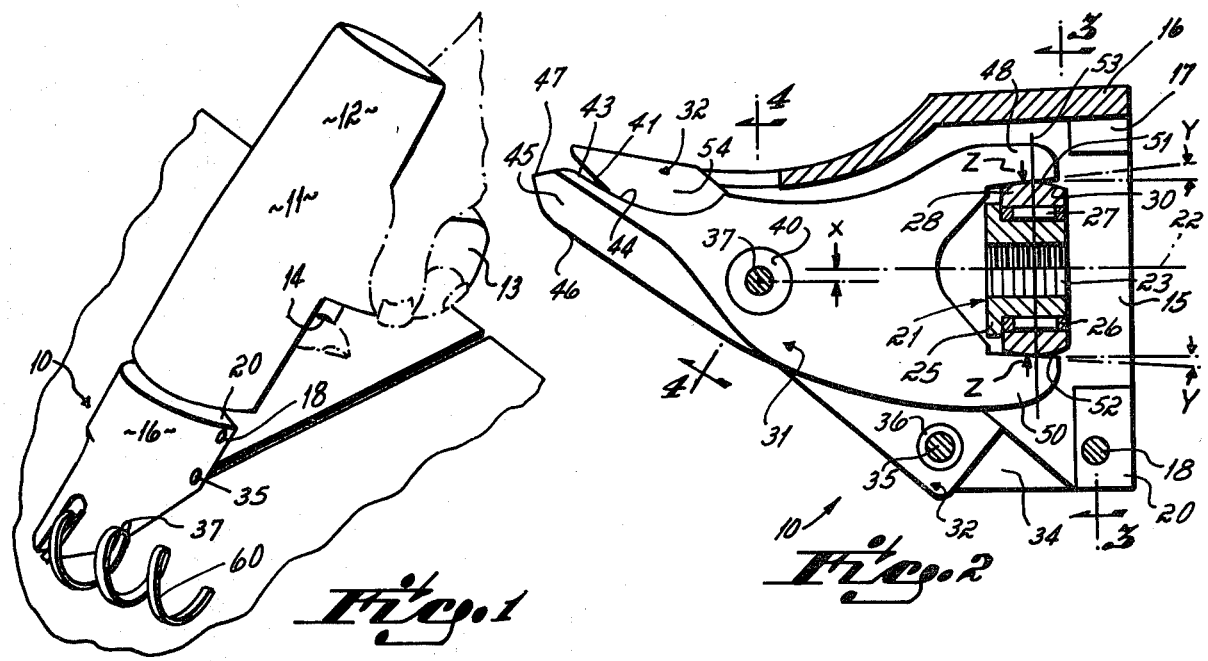

POWER SHEAR HEAD

BACKGROUND OF THE INVENTION

This invention relates to shearing devices and is particularly directed to a portable power shear for cutting sheet metal and the like. In the past, it has been proposed to provide a power shear head adapted to be mounted upon an electric motor power unit. One such shear is shown in Docken U.S. Pat. No. 2,934,822.

Shears of the general type disclosed in that patent have been manufactured and have proven quite advantageous for cutting light gage sheet metal up to 18 gage. However, it has not been possible to use such shears to cut heavier gage material, such as 14 gage mild steel sheet or 16 gage stainless steel sheet. These heavier gages are commonly used in auto body shops and cabinetry shops fabricating articles, such as kitchen sinks. Consequently, these and other shops working with heavier gage metal have not been able to utilize portable power shears and their significant advantages.

Initial efforts to adapt prior art shears, such as those commercialized under the Docken patent, to cut heavy duty metal failed even when the horsepower of the electric motor drive was increased. One difficulty which was encountered was that the shears produce a tight, small diameter curl of metal which resulted in excessive power requirements. The second difficulty was that the load imposed upon the cam ring employed to oscillate the movable shear blade caused that cam ring to be pulled off the eccentric bushing upon which it was mounted. Thus, the tool had only a very short working life.

STATEMENT OF THE PRESENT INVENTION

The principal object of the present invention is to provide a portable power shears effective to cut substantially heavier gage metal than has been possible using prior art shears.

It is a second object of the present invention to provide a shear effective to cut heavy gage metal while retaining all of the advantages of previous power shears, such as compactness, relative light weight, as well as the ability to cut along a straight line, curved line or along an irregular path.

Power shears of the present invention comprise the same general organization of parts utilized in prior art shears. More particularly, the shears includes two spaced stationary blades and an oscillating, pivotally mounted, center blade. This movable blade carries two spaced arms which engage a cam ring mounted around an eccentric bushing. This eccentric bushing is in turn affixed to the drive shaft of the motor unit.

The present invention is predicated upon the empirical discovery and determination that problems involved in cutting heavy gage material can be overcome by incorporating three critical relationships in the power shear. These relationships involve, first, the provision of diverging arms formed on the rear edge of the movable blade for engagement with the cam ring. Secondly, the pivot point of the movable shear blade is shifted to the opposite side of the motor drive axis, i.e., the side remote from the cutting edge of the blade. Finally, contact is established between the arms of the movable blade and the circular ram ring on portions of the ring disposed toward the cutting edges from the transverse center line of the ring.

It has been empirically determined that this specific construction is effective to cut heavier gage sheet metal with a minimum increase in the motor horsepower required. One reason for this highly advantageous result is that the specific combination of elements is effective to produce a curl of cut metal which has a sufficiently small diameter to enable it to clear both the shear and the workpiece while at the same time is not too small as to waste an excessive amount of energy in its formation.

A second factor which contributes to the operation of the present shear is that the tendency for the cam ring to be pulled off the eccentric bushing is eliminated. As a result, the present shears have proven to be extremely durable in operation.

These and other objects and advantages of the present invention will be more readily apparent from a consideration of the detailed description of the drawings illustrating a preferred embodiment of the invention.

BRIEF DESCRIPTION OF THE DRAWINGS

FIG. 1 is a perspective view of a power shear embodying the present invention showing the manner in which the power shear is used to cut sheet metal.

FIG. 2 is a longitudinal, cross-sectional view through the power shear.

FIG. 3 is a transvers, cross-sectional view through the power shear taken along line 3—3 of FIG. 2.

FIG. 4 is a cross-sectional view taken along line 4—4 of FIG. 2.

FIG. 5 is an end view of the cutting blades.

FIG. 6 is a partial cross-sectional view similar to FIG. 2 of a prior art power shear.

DETAILED DESCRIPTION OF THE DRAWINGS

A preferred embodiment of the power shear 10 of this invention is shown in FIG. 1. As there shown, the power shear 10 is mounted upon a power, or motor, unit 11. The details of construction of the power unit constitute no part of the present invention and it is contemplated that this power unit may take many different forms. In the embodiment shown, the power unit has an outline configuration generally like that of a conventional power drill and includes a motor housing 12, handle 13 and on-off switch 14.

The forward end of the motor unit 11 includes a circular boss (not shown) which receives the tubular end 15 of housing 16 of the shear unit. The boss of the motor unit also preferably includes a longitudinal groove to provide a clearance space. The shear unit housing 16 is rigidly mounted upon the boss by tightening bolts 18 which span two depending, spaced flanges 20 formed on the lower portion of housing 16. One of these flanges is provided with a recess for receiving the head of each of the bolts 18, while the other flange is provided with an aligned opening for receiving a nut member.

The power unit 11 also includes a forwardly extending drive shaft (not shown) which is coaxial with the boss and is provided with a threaded end. This power drive shaft, which is rotated by the motor of unit 11, threadably receives a drive bushing 21. As is best shown in FIG. 3, drive bushing 21 is of cylindrical outline configuration with the axis 22 of threaded drive shaft opening 23 being disposed parallel to, but spaced from, the center line 24 of the drive bushing. The forward face of the drive bushing 21 includes a hexagonal nut portion 25 which provides means for firmly securing the drive bushing upon the drive shaft of the motor unit 11.

Drive bushing 21 is surrounded by a channel-shaped retainer 26 for needle bearings 27. Retainer 26 is press-fit into an annular cam ring 28. The periphery 30 of this ring is arcuate in transverse section as best shown in FIG. 2. In the preferred embodiment, ring 28 is constituted by a slice of a sphere so that in cross-section its periphery is formed by segments of a circle having a center located on the axis of the ring. It will be appreciated that as bushing 21 is rotated by the shaft of the motor unit. It rotates relative to ring 28 and functions together with ring 28 as an eccentric cam with the external surface of the periphery 30 on the ring having a vertical component of movement as viewed in FIGS. 2 and 3. This movement of ring 28 is utilized to reciprocate a movable shear blade 31 relative to two stationary shear blades 32 and 33.

Stationary blades 32 and 33 are mounted within a longitudinal slot 34 formed between depending flanges 20 of the housing. A bolt 35 anchors the rear edge of stationary blades 32 and 33, the bolt carrying a bushing 36 disposed between the blades.

The forward portions of the blades are secured in place by a second bolt 37 which includes a smooth cylindrical portion 38 which supports bearing sleeve 40. As is best shown in FIG. 4, blade 31 is provided with an enlarged cross-bore which pivots about bearing sleeve 40. In accordance with the present invention, the axis of pivot 38 is spaced from the axis 22 of the drive shaft and threaded bushing opening 23 on the side of the axis 22 remote from the cutting edges 41 of the stationary blades 32 and 33 and cutting edge 43 of the movable blade 31. This spacing is of the order of 1/16" and is indicated by the dimension "X" in FIG. 2.

The overall configuration of movable blade 31 is best shown in FIGS. 2 and 5. As there shown, the blade includes a forwardly extending cutting portion 43 having a flat, transverse, upper face 44, two side cutting edges 45 and a tapered lower portion 46. The forward-most edge of the blade is tapered toward a point 47. The rear portion of the blade member is configured to form two spaced bearing arms 48 and 50. These arms respectively include shoulders 51 and 52 which engage diametrically opposite points on the periphery 30 of ring 28.

In accordance with the principles of the present invention, shoulders 51 and 52 diverge outwardly with respect to lines parallel to axis 22 of the drive shaft and threaded opening 23 and eccentric member 21. The angles of divergence of these shoulders are indicated by the angle "Y" in FIG. 2. I have empirically determined that an angle of approximately 4°–5° provides optimum results in the operation of the shear.

Further, in accordance with the principles of the present invention, these shoulders engage the circumference 30 of ring 28 in an area "Z" spaced from the transverse center line 53 of the ring toward the pivot pin 37 of the movable shear.

The manner in which movable shear blade 31 cooperates with stationary shear blades 32 and 33 is best shown in FIG. 5. As there shown, the stationary shear blades include downwardly diverging inner faces 54 and 55. The juncture of these inner faces with the flat bottom faces 56 and 57 of the stationary blades define the two side cutting edges 41. The movable blade oscillates relative to these cutting edges with side surfaces 45 of the blade passing in close proximity to the cutting edges.

The critical differences between the present power shears and commercial prior art power shears can readily be determined from a comparison of FIGS. 2 and 6. FIG. 6 is a view similar to FIG. 2 of relevant portions of a commercial prior art shears.

It is to be understood that these prior art power shears are of the same overall construction as that previously described. The differences reside in the configuration of the shoulders of the movable blade, the relationship of the pivot point of the movable blade to the axis of the threaded opening in the eccentric bushing and the portions of the periphery of the cam ring contacted by the movable blade shoulders.

More particularly, in the prior commercial shears, the stationary blade 31' is pivoted about a shaft 37' which is spaced from the axis 22' of the drive shaft and threaded opening in ring 21' on the same side of the axis as the cutting edges of the stationary blades and cutting edge 43' of the movable blade. This spacing is indicated by dimension "X'" in FIG. 6.

Further, as is shown in FIG. 6, the upper and lower shoulders 51' and 52' of the movable blade are disposed in planes parallel to axis 22' so that there is no divergence between these shoulders and lines parallel to the axis 22'. Finally, the shoulders 51' and 52' engage the periphery 30' of ring 21' along the transverse center line 53' of ring 28'.

The advantage of the present power shears is that it can cut substantially heavier sheets than can be cut with prior art power shears of the construction shown in FIG. 6. For example, the new power shears can be connected to a motor unit having a rating of 0.31 horsepower and can cut mild sheet steel up to 14 gage and stainless sheet steel up to 16 gage. The prior art shears were limited to use with motors of 0.25 horsepower rating and could not be used to cut mild sheet steel any heavier than 18 gage. One of the reasons for the ability of the present shears to cut heavier gage sheet metal is that the shears produce a uniform curl 60 of waste material as is shown in FIG. 1. This curl has a small enough pitch that it will clear the shears' housing and the sheet material on the side of the shears without binding and yet is close to the maximum diameter which will function in this manner. Thus, an excessive amount of energy is not wasted in forming a tight curl and there is no resulting motor overload.

From the above disclosure of the general principles of the present invention and the foregoing detailed description of a preferred embodiment, those skilled in the art will readily comprehend various modifications to which the invention is susceptible. Therefore, we desire to be limited only by the scope of the following claims.

Having described our invention, we claim:

1. A portable power shears for cutting sheet metal, said shears being powered by a motor unit and comprising:
   a housing surrounding the drive shaft of said motor unit;
   two stationary shear blades carried by said housing in spaced relationship to one another;
   a movable shear blade disposed between said stationary blades;
   a pivot pin supporting said movable shear blade upon said housing, said pivot pin being spaced from the axis of said drive shaft on the side of said axis remote from said stationary blades;

an eccentric bushing mounted upon said drive shaft;

a ring rotatably mounted upon said bushing, said ring having an arcuate peripheral surface;

said movable blade having two spaced arms, each of said arms having a shoulder in engagement with said ring, said shoulders diverging outwardly from the axis of said drive shaft, said arms engaging said ring on portions of said ring disposed toward said pivot pin from the transverse center line of said ring.

2. The power shears of claim 1 in which the angle of divergence of each of said shoulders from the axis of the drive shaft is of the order of 4°.

3. The power shears of claim 1 in which the pivot pin is spaced from the axis of said drive shaft by an amount of the order of 1/16".

4. The power shears of claim 1 in which the periphery of the cam is a segment of a sphere.

* * * * *